US011155264B2

(12) United States Patent
Luo

(10) Patent No.: US 11,155,264 B2
(45) Date of Patent: Oct. 26, 2021

(54) SYSTEMS AND METHODS FOR DETERMINING DRIVING ACTION IN AUTONOMOUS DRIVING

(71) Applicant: BEIJING VOYAGER TECHNOLOGY CO., LTD., Beijing (CN)

(72) Inventor: Wei Luo, Beijing (CN)

(73) Assignee: BEIJING VOYAGER TECHNOLOGY CO., LTD., Beijing (CN)

(*) Notice: Subject to any disclaimer, the term of this patent is extended or adjusted under 35 U.S.C. 154(b) by 317 days.

(21) Appl. No.: 16/234,007

(22) Filed: Dec. 27, 2018

(65) Prior Publication Data

US 2020/0189590 A1 Jun. 18, 2020

Related U.S. Application Data

(63) Continuation of application No. PCT/CN2018/122072, filed on Dec. 19, 2018.

(30) Foreign Application Priority Data

Dec. 18, 2018 (CN) .......................... 201811547926.7

(51) Int. Cl.
*B60W 30/18* (2012.01)
*B60W 50/00* (2006.01)
(Continued)

(52) U.S. Cl.
CPC ............ *B60W 30/18* (2013.01); *B60W 50/00* (2013.01); *G05D 1/0088* (2013.01); *G06N 3/08* (2013.01);
(Continued)

(58) Field of Classification Search
CPC ............ G01C 21/3415; G01C 21/3492; G01C 21/3655; G01C 21/3679; G01C 21/367;
(Continued)

(56) References Cited

U.S. PATENT DOCUMENTS 10,254,759 B1 * 4/2019 Faust .................... G05D 1/0088
2004/0090117 A1 5/2004 Dudeck et al.
(Continued)

FOREIGN PATENT DOCUMENTS

CN 105549597 A 5/2016
CN 106209777 A 12/2016
(Continued)

OTHER PUBLICATIONS

International Search Report in PCT/CN2018/122072 dated Sep. 18, 2019, 5 Pages.
(Continued)

*Primary Examiner* — Nga X Nguyen
(74) *Attorney, Agent, or Firm* — Metis IP LLC

(57) ABSTRACT

The present disclosure relates to systems and methods for determining a driving action in autonomous driving. The systems may obtain driving information associated with a vehicle; determine a state of the vehicle; determine one or more candidate driving actions and one or more evaluation values corresponding to the one or more candidate driving actions based on the driving information and the state of the vehicle by using a trained driving-action model; select a target driving action from the one or more candidate driving actions based on the one or more evaluation values; determine a target driving path based on the target driving action; and send signals to a control component of the vehicle to direct the vehicle to take the target driving action to follow the target driving path.

18 Claims, 9 Drawing Sheets

(51) Int. Cl.
  *G05D 1/00*   (2006.01)
  *G06N 20/00*  (2019.01)
  *G06N 3/08*   (2006.01)

(52) U.S. Cl.
  CPC ....... *G06N 20/00* (2019.01); *B60W 2050/005* (2013.01); *B60W 2050/0014* (2013.01); *B60W 2400/00* (2013.01); *B60W 2520/105* (2013.01); *B60W 2552/00* (2020.02); *B60W 2554/00* (2020.02); *G05D 2201/0213* (2013.01)

(58) Field of Classification Search
  CPC ............ G01C 21/3697; G01C 21/3626; G05D 1/0088; G05D 2201/0213; G05D 1/0214; G05D 1/0221; G05D 1/02; G05D 1/08; G05D 1/0223; G05D 1/0229; G05D 2201/0212; B60W 30/18; B60W 50/00; B60W 2552/00; B60W 2554/00; B60W 2050/005; B60W 2050/0014; B60W 2520/105; B60W 2400/00; B60W 2050/0089; B60W 2520/10; B60W 2520/12; B60W 2556/40; B60W 60/0011; B60W 40/105; B60W 40/06; B60W 30/10; B60W 40/04; B60W 60/00; G06N 3/08; G06N 20/00; G06N 20/10; G06N 5/003; G06N 3/088; G06N 3/006; G06K 9/46

See application file for complete search history.

(56) References Cited

U.S. PATENT DOCUMENTS

| | | |
|---|---|---|
| 2015/0211868 A1 | 7/2015 | Matsushita et al. |
| 2016/0091896 A1 | 3/2016 | Maruyama |
| 2016/0129907 A1 | 5/2016 | Kim et al. |
| 2017/0060137 A1 | 3/2017 | Shitamoto |
| 2017/0168492 A1 | 6/2017 | Shitamoto |
| 2017/0308090 A1 | 10/2017 | Asakura |
| 2018/0025234 A1 | 1/2018 | Myers et al. |
| 2018/0032082 A1 | 2/2018 | Shalev-Shwartz et al. |
| 2018/0136644 A1 | 5/2018 | Levinson et al. |
| 2018/0170370 A1* | 6/2018 | Kataoka ................ B60W 30/12 |
| 2018/0201273 A1 | 7/2018 | Xiao et al. |
| 2018/0345963 A1 | 12/2018 | Maura |
| 2018/0348751 A1 | 12/2018 | Newman |
| 2018/0348777 A1 | 12/2018 | Kawabe et al. |
| 2019/0185018 A1* | 6/2019 | Tao ....................... B60W 50/14 |
| 2019/0265713 A1 | 8/2019 | Zhou et al. |
| 2019/0291726 A1* | 9/2019 | Shalev-Shwartz .......................... B60W 30/18163 |

FOREIGN PATENT DOCUMENTS

| | | |
|---|---|---|
| CN | 106292432 A | 1/2017 |
| CN | 106527452 A | 3/2017 |
| CN | 106681335 A | 5/2017 |
| CN | 106774327 A | 5/2017 |
| CN | 106875511 A | 6/2017 |
| CN | 107491072 A | 12/2017 |
| CN | 108009587 A | 5/2018 |
| CN | 108196535 A | 6/2018 |
| CN | 108227710 A | 6/2018 |
| CN | 108290579 A | 7/2018 |
| WO | 2018172849 A1 | 9/2018 |
| WO | 2019010659 A1 | 1/2019 |
| WO | 2020124438 A1 | 6/2020 |

OTHER PUBLICATIONS

Written Opinion in PCT/CN2018/122072 dated Sep. 18, 2019, 5 Pages.
International Search Report in PCT/CN2017/092714 dated Apr. 20, 2018, 4 Pages.
Written Opinion in PCT/CN2017/092714 dated Apr. 20, 2018, 3 Pages.
Wang, Sen et al., Deep Reinforcement Learning for Autonomous Driving, Deep Reinforcement Learning and Control Course Project, 2017, 9 pages.
Martin Buechel et al., Deep Reinforcement Learning for Predictive Longitudinal Control of Automated Vehicles, 21st International Conference on Intelligent Transportation Systems (ITSC), 2018, 8 pages.
Timothy P. Lillicrap et al., Continuous Control with Deep Reinforcement Learning, ICLR, 2015, 14 pages.
Hu, Xuemin et al., Dynamic Path Planning for Autonomous Driving on Various Roads with Avoidance of Static and Moving obstacles, Mechanical Systems and Signal Processing, 100: 482-500, 2018.
Zhang, Yi et al., Human-like Autonomous Vehicle Speed Control by Deep Reinforcement Learning with Double Q-Learning, 2018 IEEE Intelligent Vehicles Symposium (IV), 1251-1256, 2018.
Extended European Search Report in European Application No. 18819523.4 dated Jul. 20, 2020, 11 pages.
Examination Report No. 2 in Australian Patent Application No. 2018286610 dated Jul. 27, 2020, 7 pages.
Examination report No. 1 in Australian application No. 2018286610 dated Dec. 16, 2019, 11 Pages.

* cited by examiner

SYSTEMS AND METHODS FOR DETERMINING DRIVING ACTION IN AUTONOMOUS DRIVING

CROSS-REFERENCE TO RELATED APPLICATIONS

This application is a continuation of International Application No. PCT/CN2018/122072 filed on Dec. 19, 2018 which designates the United States of America and claims priority to Chinese Patent Application No. 201811547926.7 filed on Dec. 18, 2018, the contents of which are incorporated herein by reference in their entirety.

TECHNICAL FIELD

The present disclosure generally relates to systems and methods for autonomous driving, and in particular, to systems and methods for determining driving action in autonomous driving.

BACKGROUND

With the development of micro-electronic and robot technologies, the exploration of autonomous driving has developed rapidly nowadays. For an autonomous driving system, it is important to determine a suitable driving action (e.g., "turn left," "turn right," "stop") based on driving information (e.g., a start location, a defined destination, road condition) associated with a vehicle of the autonomous driving system. Thereafter and accordingly, the autonomous driving system would plan a suitable driving path based on the driving action. Commonly, the autonomous driving system determines the driving action according to artificially defined rules. However, in some situations, the artificially defined rules may be insufficient, inaccurate or unsuitable and it would therefore be difficult to determine an optimal driving action or an optimal driving path. Therefore, it is desirable to provide methods and systems for accurate and efficient determination of the driving action, thereby improving performance of the autonomous driving system.

SUMMARY

An aspect of the present disclosure relates to a system for determining a driving action in autonomous driving. The system may include at least one storage medium including a set of instructions and at least one processor in communication with the at least one storage medium. When executing the set of instructions, the at least one processor may be directed to cause the system to perform one or more of the following operations. The system may obtain driving information associated with a vehicle. The system may determine a state of the vehicle. The system may determine one or more candidate driving actions and one or more evaluation values corresponding to the one or more candidate driving actions based on the driving information and the state of the vehicle by using a trained driving-action model. The system may select a target driving action from the one or more candidate driving actions based on the one or more evaluation values. The system may determine a target driving path based on the target driving action. The system may send signals to a control component of the vehicle to direct the vehicle to take the target driving action to follow the target driving path.

In some embodiments, the driving information associated with the vehicle may include perception information within a first predetermined range of the vehicle and/or map information within the first predetermined range of the vehicle.

In some embodiments, the perception information may include road condition information and/or obstacle information.

In some embodiments, the state of the vehicle may include a velocity of the vehicle, an acceleration of the vehicle, and/or an angle of a steering wheel of the vehicle.

In some embodiments, the trained driving-action model may be determined with a training process. The training process may include obtaining a preliminary driving-action model; obtaining preliminary sample driving information, the preliminary sample driving information including preliminary sample perception information within a second predetermined range of a sample vehicle and preliminary sample map information within the second predetermined range of the sample vehicle; obtaining a preliminary sample state of the sample vehicle; determining a preliminary sample driving action based on the preliminary sample driving information, the preliminary sample state of the sample vehicle, and the preliminary driving-action model; determining a preliminary sample evaluation value associated with the preliminary driving-action model based on a preliminary reward value corresponding to the preliminary sample driving action, wherein the preliminary reward value is associated with a distance between a preliminary sample driving path associated with the preliminary sample driving action and an obstacle; determining whether the preliminary sample evaluation value satisfies a preset condition; and designating the preliminary driving-action model as the trained driving-action model in response to the determination that the preliminary sample evaluation value satisfies the preset condition.

In some embodiments, the training process may further include in response to the determination that the preliminary sample evaluation value does not satisfy the preset condition, performing one or more iterations for updating the preliminary driving-action model until an updated sample evaluation value satisfies the preset condition. Each of the one or more iterations may include determining an updated driving-action model based on a reward value in a previous iteration; obtaining updated sample driving information; estimating an updated sample state of the sample vehicle based on a sample driving action in the previous iteration and a sample state of the sample vehicle in the previous iteration; determining an updated sample driving action based on the updated sample driving information, the updated sample state of the sample vehicle, and the updated driving-action model; determining an updated sample evaluation value associated with the updated driving-action model based on an updated reward value corresponding to the updated sample driving action and a sample evaluation value in the previous iteration; and determining whether the updated sample evaluation value satisfies the preset condition.

In some embodiments, the trained driving-action model may include a Q-learning neural network model.

In some embodiments, the system may select the target driving action from the one or more candidate driving actions based on the one or more evaluation values according to a predetermined rule.

Another aspect of the present disclosure relates to a method implemented on a computing device. The computing device may include at least one processor, at least one storage medium, and a communication platform connected to a network. The method may include obtaining driving information associated with a vehicle; determining a state of the vehicle; determining one or more candidate driving actions and one or more evaluation values corresponding to the one or more candidate driving actions based on the driving information and the state of the vehicle by using a trained driving-action model; selecting a target driving action from the one or more candidate driving actions based on the one or more evaluation values; determining a target driving path based on the target driving action; and sending signals to a control component of the vehicle to direct the vehicle to take the target driving action to follow the target driving path.

In some embodiments, the driving information associated with the vehicle may include perception information within a first predetermined range of the vehicle and/or map information within the first predetermined range of the vehicle.

In some embodiments, the perception information may include road condition information and/or obstacle information.

In some embodiments, the state of the vehicle may include a velocity of the vehicle, an acceleration of the vehicle, and/or an angle of a steering wheel of the vehicle.

In some embodiments, the trained driving-action model may be determined with a training process. The training process may include obtaining a preliminary driving-action model; obtaining preliminary sample driving information, the preliminary sample driving information including preliminary sample perception information within a second predetermined range of a sample vehicle and preliminary sample map information within the second predetermined range of the sample vehicle; obtaining a preliminary sample state of the sample vehicle; determining a preliminary sample driving action based on the preliminary sample driving information, the preliminary sample state of the sample vehicle, and the preliminary driving-action model; determining a preliminary sample evaluation value associated with the preliminary driving-action model based on a preliminary reward value corresponding to the preliminary driving action, wherein the preliminary reward value is associated with a distance between a preliminary sample driving path associated with the preliminary sample driving action and an obstacle; determining whether the preliminary sample evaluation value satisfies a preset condition; and designating the preliminary driving-action model as the trained driving-action model in response to the determination that the preliminary sample evaluation value satisfies the preset condition.

In some embodiments, the training process may further include in response to the determination that the preliminary sample evaluation value does not satisfy the preset condition, performing one or more iterations for updating the preliminary driving-action model until an updated sample evaluation value satisfies the preset condition. Each of the one or more iterations may include determining an updated driving-action model based on a reward value in a previous iteration; obtaining updated sample driving information; estimating an updated sample state of the sample vehicle based on a sample driving action in the previous iteration and a sample state of the sample vehicle in the previous iteration; determining an updated sample driving action based on the updated sample driving information, the updated sample state of the sample vehicle, and the updated driving-action model; determining an updated sample evaluation value associated with the updated driving-action model based on an updated reward value corresponding to the updated sample driving action and a sample evaluation value in the previous iteration; and determining whether the updated sample evaluation value satisfies the preset condition.

In some embodiments, the trained driving-action model may include a Q-learning neural network model.

In some embodiments, selecting the target driving action from the one or more candidate driving actions based on the one or more evaluation values may include selecting the target driving action from the one or more candidate driving actions based on the one or more evaluation values according to a predetermined rule.

A further aspect of the present disclosure relates to a vehicle configured for autonomous driving. The vehicle may include a detecting component, a planning component, and a control component. The planning component may be configured to obtain driving information associated with a vehicle; determine a state of the vehicle; determine one or more candidate driving actions and one or more evaluation values corresponding to the one or more candidate driving actions based on the driving information and the state of the vehicle by using a trained driving-action model; select a target driving action from the one or more candidate driving actions based on the one or more evaluation values; determine a target driving path based on the target driving action; and send signals to the control component of the vehicle to direct the vehicle to take the target driving action to follow the target driving path.

In some embodiments, the driving information associated with the vehicle may include perception information within a first predetermined range of the vehicle and/or map information within the first predetermined range of the vehicle.

In some embodiments, the perception information may include road condition information and/or obstacle information.

In some embodiments, the state of the vehicle may include a velocity of the vehicle, an acceleration of the vehicle, and/or an angle of a steering wheel of the vehicle.

In some embodiments, the trained driving-action model may be determined with a training process. The training process may include obtaining a preliminary driving-action model; obtaining preliminary sample driving information, the preliminary sample driving information including preliminary sample perception information within a second predetermined range of a sample vehicle and preliminary sample map information within the second predetermined range of the sample vehicle; obtaining a preliminary sample state of the sample vehicle; determining a preliminary sample driving action based on the preliminary sample driving information, the preliminary sample state of the sample vehicle, and the preliminary driving-action model; determining a preliminary sample evaluation value associated with the preliminary driving-action model based on a preliminary reward value corresponding to the preliminary driving action, wherein the preliminary reward value is associated with a distance between a preliminary sample driving path associated with the preliminary sample driving action and an obstacle; determining whether the preliminary sample evaluation value satisfies a preset condition; and designating the preliminary driving-action model as the trained driving-action model in response to the determination that the preliminary sample evaluation value satisfies the preset condition.

In some embodiments, the training process may further include in response to the determination that the preliminary sample evaluation value does not satisfy the preset condition, performing one or more iterations for updating the preliminary driving-action model until an updated sample evaluation value satisfies the preset condition. Each of the one or more iterations may include determining an updated driving-action model based on a reward value in a previous iteration; obtaining updated sample driving information; estimating an updated sample state of the sample vehicle based on a sample driving action in the previous iteration and a sample state of the sample vehicle in the previous iteration; determining an updated sample driving action based on the updated sample driving information, the updated sample state of the sample vehicle, and the updated driving-action model; determining an updated sample evaluation value associated with the updated driving-action model based on an updated reward value corresponding to the updated sample driving action and a sample evaluation value in the previous iteration; and determining whether the updated sample evaluation value satisfies the preset condition.

In some embodiments, the trained driving-action model may include a Q-learning neural network model.

In some embodiments, the planning component may be further configured to select the target driving action from the one or more candidate driving actions based on the one or more evaluation values according to a predetermined rule.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
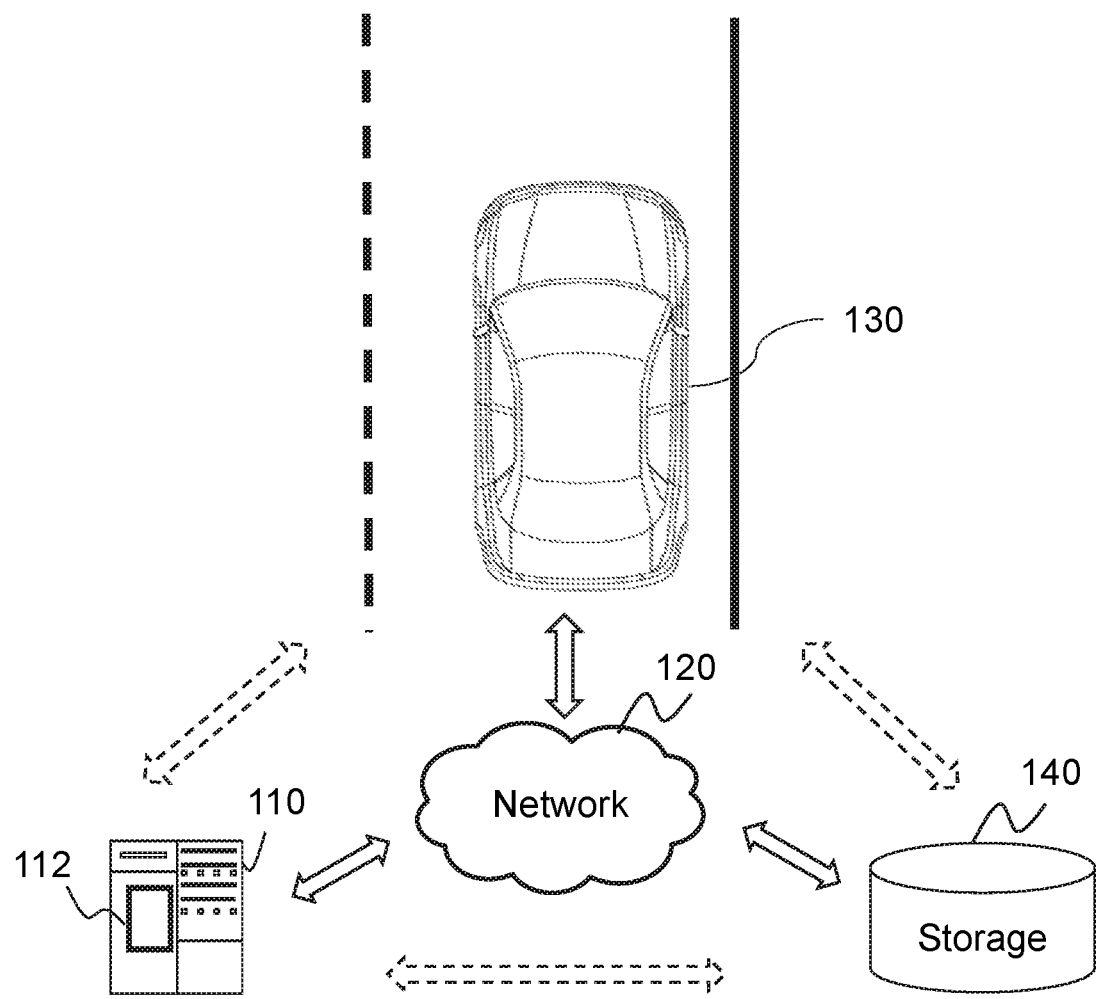
FIG. 1 is a schematic diagram illustrating an exemplary autonomous driving system according to some embodiments of the present disclosure.

The following description is presented to enable any person skilled in the art to make and use the present disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this disclosure, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operations and functions of the related elements of structure and the combination of parts and economies of manufacture, may become more apparent upon consideration of the following description with reference to the accompanying drawings, all of which form part of this disclosure. It is to be expressly understood, however, that the drawings are for the purpose of illustration and description only and are not intended to limit the scope of the present disclosure. It is understood that the drawings are not to scale.

The flowcharts used in the present disclosure illustrate operations that systems implement according to some embodiments of the present disclosure. It is to be expressly understood, the operations of the flowcharts may be implemented not in order. Conversely, the operations may be implemented in inverted order, or simultaneously. Moreover, one or more other operations may be added to the flowcharts. One or more operations may be removed from the flowcharts.

Moreover, while the systems and methods disclosed in the present disclosure are described primarily regarding a transportation system in land, it should be understood that this is only one exemplary embodiment. The systems and methods of the present disclosure may be applied to any other kind of transportation system. For example, the systems and methods of the present disclosure may be applied to transportation systems of different environments including ocean, aerospace, or the like, or any combination thereof. The vehicle of the transportation systems may include a car, a bus, a train, a subway, a vessel, an aircraft, a spaceship, a hot-air balloon, or the like, or any combination thereof.

The positioning technology used in the present disclosure may be based on a global positioning system (GPS), a global navigation satellite system (GLONASS), a compass navigation system (COMPASS), a Galileo positioning system, a quasi-zenith satellite system (QZSS), a wireless fidelity (WiFi) positioning technology, or the like, or any combination thereof. One or more of the above positioning systems may be used interchangeably in the present disclosure.

An aspect of the present disclosure relates to systems and methods for determining a driving action in autonomous driving. According to some systems and methods of the present disclosure, the processor may obtain driving information (e.g., road condition information, obstacle information, map information) associated with a vehicle, determine a state (e.g., a velocity, an acceleration, an angle of a steering wheel) of the vehicle, determine one or more candidate driving actions and one or more evaluation values corresponding to the one or more candidate driving actions based on the driving information and the state of the vehicle by using a trained driving-action model (e.g., a Q-learning neural network model), and select a target driving action from the one or more candidate driving actions based on the one or more evaluation values. Furthermore, according to some systems and methods of the present disclosure, the processor may further determine a target driving path based on the target driving action and send signals to a control component of the vehicle to direct the vehicle to take the target driving action to follow the target driving path. According to the systems and methods of the present disclosure, the driving action is determined based on a trained model, which can improve the accuracy of the path planning for the vehicle.

FIG. 1 is a schematic diagram illustrating an exemplary autonomous driving system according to some embodiments of the present disclosure. In some embodiments, the autonomous driving system 100 may include a server 110, a network 120, a vehicle 130, and a storage 140.

In some embodiments, the server 110 may be a single server or a server group. The server group may be centralized or distributed (e.g., the server 110 may be a distributed system). In some embodiments, the server 110 may be local or remote. For example, the server 110 may access information and/or data stored in the vehicle 130 and/or the storage 140 via the network 120. As another example, the server 110 may be directly connected to the vehicle 130 and/or the storage 140 to access stored information and/or data. In some embodiments, the server 110 may be implemented on a cloud platform or an onboard computer. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented on a computing device 200 including one or more components illustrated in FIG. 2 in the present disclosure.

In some embodiments, the server 110 may include a processing engine 112. The processing engine 112 may process information and/or data associated with driving information and/or a state of the vehicle 130 to perform one or more functions described in the present disclosure. For example, the processing engine 112 may obtain driving information (e.g., road condition information, obstacle information) associated with the vehicle 130 and/or a state (e.g., a current location, a current velocity) of the vehicle 130. The processing engine 112 may determine a driving action (e.g., "turn left," "turn right," "stop") based on the driving information and/or the state of the vehicle 130. That is, the processing engine 112 may be configured as a planning component of the vehicle 130. As another example, the processing engine 112 may determine a driving path based on the driving action. As a further example, the processing engine 112 may determine control instructions (e.g., a velocity control instruction, a direction control instruction) based on the driving path. In some embodiments, the processing engine 112 may include one or more processing engines (e.g., single-core processing engine(s) or multi-core processor(s)). Merely by way of example, the processing engine 112 may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof.

In some embodiments, the server 110 may be connected to the network 120 to communicate with one or more components (e.g., the vehicle 130, the storage 140) of the autonomous driving system 100. In some embodiments, the server 110 may be directly connected to or communicate with one or more components (e.g., the vehicle 130, the storage 140) of the autonomous driving system 100. In some embodiments, the server 110 may be integrated in the vehicle 130. For example, the server 110 may be a computing device (e.g., an on-board computer) installed in the vehicle 130.

The network 120 may facilitate exchange of information and/or data. In some embodiments, one or more components (e.g., the server 110, the vehicle 130, or the storage 140) of the autonomous driving system 100 may send information and/or data to other component(s) of the autonomous driving system 100 via the network 120. For example, the server 110 may obtain driving information associated with the vehicle 130 and/or a state of the vehicle 130 via the network 120. In some embodiments, the network 120 may be any type of wired or wireless network, or combination thereof. Merely by way of example, the network 120 may include a cable network, a wireline network, an optical fiber network, a telecommunications network, an intranet, an Internet, a local area network (LAN), a wide area network (WAN), a wireless local area network (WLAN), a metropolitan area network (MAN), a public telephone switched network (PSTN), a Bluetooth network, a ZigBee network, a near field communication (NFC) network, or the like, or any combination thereof. In some embodiments, the network 120 may include one or more network access points. For example, the network 120 may include wired or wireless network access points, through which one or more components of the autonomous driving system 100 may be connected to the network 120 to exchange data and/or information.

The vehicle 130 may be any type of autonomous vehicle. The autonomous vehicle may be capable of sensing environmental information and navigating without human maneuvering. The vehicle 130 may include structures of a conventional vehicle. For example, the vehicle 130 may include a plurality of control components configured to control operations of the vehicle 130. The plurality of control components may include a steering device (e.g., a steering wheel), a brake device (e.g., a brake pedal), an accelerator, etc. The steering device may be configured to adjust a heading and/or a direction of the vehicle 130. The brake device may be configured to perform a braking operation to stop the vehicle 130. The accelerator may be configured to control a velocity and/or an acceleration of the vehicle 130.

The vehicle 130 may also include a plurality of detection units configured to detect driving information associated with the vehicle 130. The plurality of detection units may include a camera, a global position system (GPS) module, an acceleration sensor (e.g., a piezoelectric sensor), a velocity sensor (e.g., a Hall sensor), a distance sensor (e.g., a radar, a LIDAR, an infrared sensor), a steering angle sensor (e.g., a tilt sensor), a traction-related sensor (e.g., a force sensor), etc. In some embodiments, the driving information associated with the vehicle 130 may include perception information (e.g., road condition information, obstacle information) within a range of the vehicle 130, map information within the range of the vehicle 130, etc.

The storage 140 may store data and/or instructions. In some embodiments, the storage 140 may store data obtained from the vehicle 130, such as driving information and/or a state of the vehicle 130 acquired by the plurality of detection units. In some embodiments, the storage 140 may store data and/or instructions that the server 110 may execute or use to perform exemplary methods described in the present disclosure. In some embodiments, the storage 140 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyrisor RAM (T-RAM), and a zero-capacitor RAM (Z-RAM), etc. Exemplary ROM may include a mask ROM (MROM), a programmable ROM (PROM), an erasable programmable ROM (EPROM), an electrically-erasable programmable ROM (EEPROM), a compact disk ROM (CD-ROM), and a digital versatile disk ROM, etc. In some embodiments, the storage 140 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage 140 may be connected to the network 120 to communicate with one or more components (e.g., the server 110, the vehicle 130) of the autonomous driving system 100. One or more components of the autonomous driving system 100 may access the data or instructions stored in the storage 140 via the network 120. In some embodiments, the storage 140 may be directly connected to or communicate with one or more components (e.g., the server 110 and the vehicle 130) of the autonomous driving system 100. In some embodiments, the storage 140 may be part of the server 110. In some embodiments, the storage 140 may be integrated in the vehicle 130.

It should be noted that the autonomous driving system 100 is merely provided for the purposes of illustration, and is not intended to limit the scope of the present disclosure. For persons having ordinary skills in the art, multiple variations or modifications may be made under the teachings of the present disclosure. For example, the autonomous driving system 100 may further include a database, an information source, etc. As another example, the autonomous driving system 100 may be implemented on other devices to realize similar or different functions. However, those variations and modifications do not depart from the scope of the present disclosure.

Figure 2:
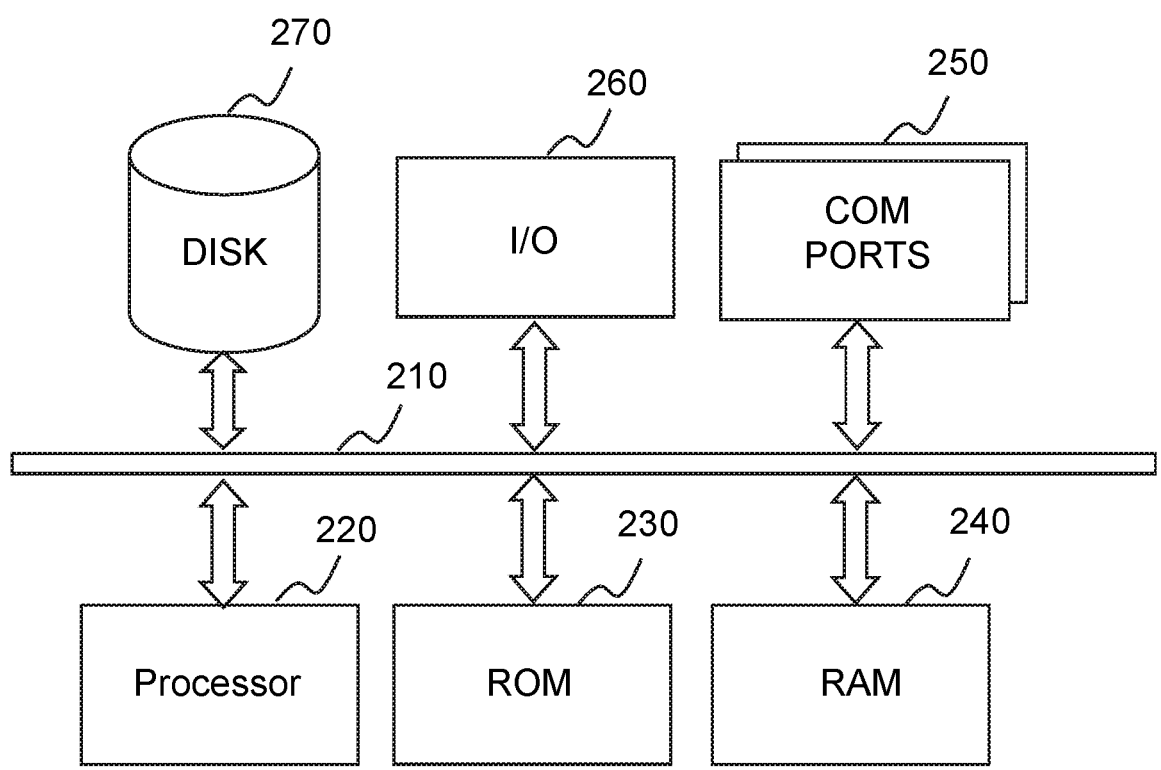
FIG. 2 is a schematic diagram illustrating exemplary hardware and/or software components of an exemplary computing device according to some embodiments of the present disclosure.

FIG. 2 is a schematic diagram illustrating exemplary hardware and/or software components of an exemplary computing device according to some embodiments of the present disclosure. In some embodiments, the server 110 may be implemented on the computing device 200. For example, the processing engine 112 may be implemented on the computing device 200 and configured to perform functions of the processing engine 112 disclosed in this disclosure.

The computing device 200 may be used to implement any component of the autonomous driving system 100 of the present disclosure. For example, the processing engine 112 of the autonomous driving system 100 may be implemented on the computing device 200, via its hardware, software program, firmware, or a combination thereof. Although only one such computer is shown for convenience, the computer functions related to the autonomous driving system 100 as described herein may be implemented in a distributed manner on a number of similar platforms to distribute the processing load.

The computing device 200, for example, may include communication (COMM) ports 250 connected to and from a network (e.g., the network 120) connected thereto to facilitate data communications. The computing device 200 may also include a processor (e.g., a processor 220), in the form of one or more processors (e.g., logic circuits), for executing program instructions. For example, the processor may include interface circuits and processing circuits therein. The interface circuits may be configured to receive electronic signals from a bus 210, wherein the electronic signals encode structured data and/or instructions for the processing circuits to process. The processing circuits may conduct logic calculations, and then determine a conclusion, a result, and/or an instruction encoded as electronic signals. Then the interface circuits may send out the electronic signals from the processing circuits via the bus 210.

The computing device 200 may further include program storage and data storage of different forms, for example, a disk 270, and a read only memory (ROM) 230, or a random access memory (RAM) 240, for storing various data files to be processed and/or transmitted by the computing device 200. The computing device 200 may also include program instructions stored in the ROM 230, the RAM 240, and/or other type of non-transitory storage medium to be executed by the processor 220. The methods and/or processes of the present disclosure may be implemented as the program instructions. The computing device 200 also includes an I/O component 260, supporting input/output between the computing device 200 and other components therein. The computing device 200 may also receive programming and data via network communications.

Merely for illustration, only one processor is described in the computing device 200. However, it should be noted that the computing device 200 in the present disclosure may also include multiple processors, and thus operations that are performed by one processor as described in the present disclosure may also be jointly or separately performed by the multiple processors. For example, the processor of the computing device 200 executes both operation A and operation B. As in another example, operation A and operation B may also be performed by two different processors jointly or separately in the computing device 200 (e.g., the first processor executes operation A and the second processor executes operation B, or the first and second processors jointly execute operations A and B).

Figure 3:
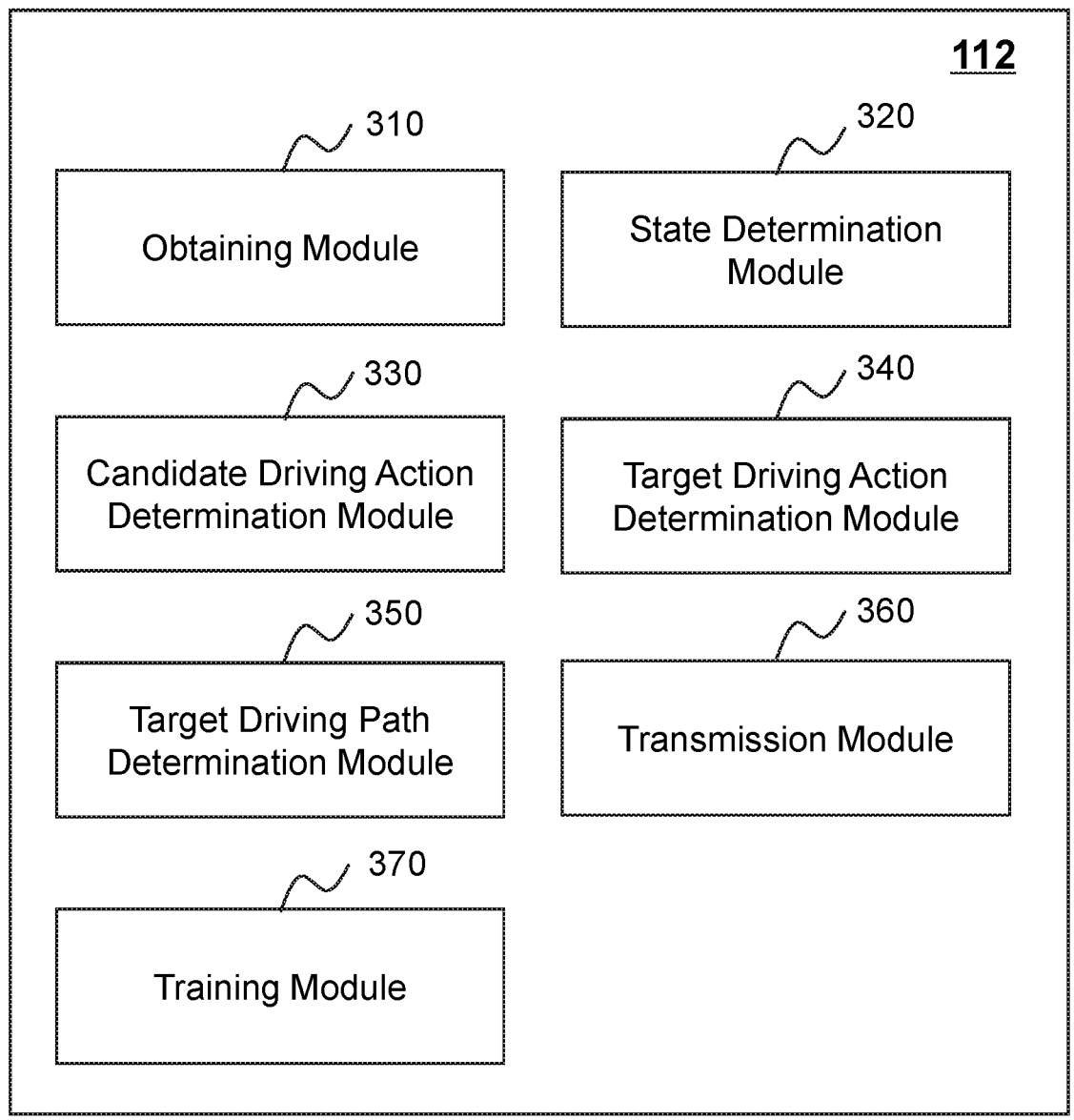
FIG. 3 is a block diagram illustrating an exemplary processing engine according to some embodiments of the present disclosure.

FIG. 3 is a block diagram illustrating an exemplary processing engine according to some embodiments of the present disclosure. The processing engine 112 may include an obtaining module 310, a state determination module 320, a candidate driving action determination module 330, a target driving action determination module 340, a target driving path determination module 350, a transmission module 360, and a training module 370.

The obtaining module 310 may be configured to obtain driving information associated with a vehicle (e.g., the vehicle 130). The obtaining module 310 may obtain the driving information from the detection units (e.g., a camera, a radar) of the vehicle, a storage device (e.g., the storage 140) disclosed elsewhere in the present disclosure, or an external resource (e.g., a traffic guidance platform, a news platform). The obtaining module 310 may obtain the driving information according to a certain time interval (e.g., 0.01 seconds, 0.02 seconds, 0.05 seconds), in real time, or substantially in real time. More descriptions of the driving information may be found elsewhere in the present disclosure (e.g., FIG. 4 and the descriptions thereof).

The state determination module 320 may be configured to determine a state of the vehicle. The state determination module 320 may determine the state of the vehicle according to a certain time interval (e.g., 0.01 seconds, 0.02 seconds, 0.05 seconds), in real time, or substantially in real time. More descriptions of the state of the vehicle may be found elsewhere in the present disclosure (e.g., FIG. 4 and the descriptions thereof).

The candidate driving action determination module 330 may be configured to determine one or more candidate driving actions and one or more evaluation values corresponding to the one or more candidate driving actions based on the driving information and the state of the vehicle by using a trained driving-action model. More descriptions of the driving action may be found elsewhere in the present disclosure (e.g., FIG. 4 and the descriptions thereof).

The target driving action determination module 340 may be configured to select a target driving action from the one or more candidate driving actions based on the one or more evaluation values. In some embodiments, the target driving action determination module 340 may identify a highest evaluation value from the one or more evaluation values corresponding to the one or more candidate driving actions and select a candidate driving action corresponding to the highest evaluation value as the target driving action. In some embodiments, the target driving action determination module 340 may select the target driving action from the one or more candidate driving actions according to a predetermined rule.

The target driving path determination module 350 may be configured to determine a target driving path based on the target driving action. For example, the target driving path determination module 350 may determine a plurality of candidate driving paths based on the driving information associated with the vehicle, the state of the vehicle, and the target driving action. The target driving path determination module 350 may further select the target driving path from the plurality of candidate driving paths based on based on one or more features associated with each of the plurality of candidate driving paths, for example, an offset from the candidate driving path to a center line of a lane, a travel time of the candidate driving path, a comfort level of the candidate driving path, a distance between the candidate driving path and an obstacle, etc.

The transmission module 360 may be configured to send signals to one or more control components (e.g., the steering device, the brake device, the accelerator) of the vehicle to direct the vehicle to take the target driving action to follow the target driving path. For example, the transmission module 360 may determine control commands (e.g., a steering command, an acceleration command) associated with the target driving action and the target driving path and transmit the control commands to the one or more control components.

The training module 370 may be configured to determine a trained driving-action model (e.g., a trained Q-learning neural network model) based on sample driving information associated with a sample vehicle and a sample state of the sample vehicle. More descriptions of the determination of the trained driving-action model may be found elsewhere in the present disclosure (e.g., FIGS. 5-6 and the descriptions thereof).

The modules in the processing engine 112 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined into a single module, and any one of the modules may be divided into two or more units. For example, the obtaining module 310 and the state determination module 320 may be combined as a single module which may both obtain the driving information associated with the vehicle and the state of the vehicle. As another example, the candidate driving action determination module 330 and the target driving action determination module 340 may be combined as a single module which may both determine one or more candidate driving actions and a target driving action. As a further example, the processing engine 112 may include a storage module (not shown) used to store information and/or data (e.g., the driving information associated with the vehicle, the state of the vehicle) associated with the vehicle. As still a further example, the training module 370 may be unnecessary and the trained driving-action model may be obtained from a storage device (e.g., the storage 140), such as the ones disclosed elsewhere in the present disclosure.

Figure 4:
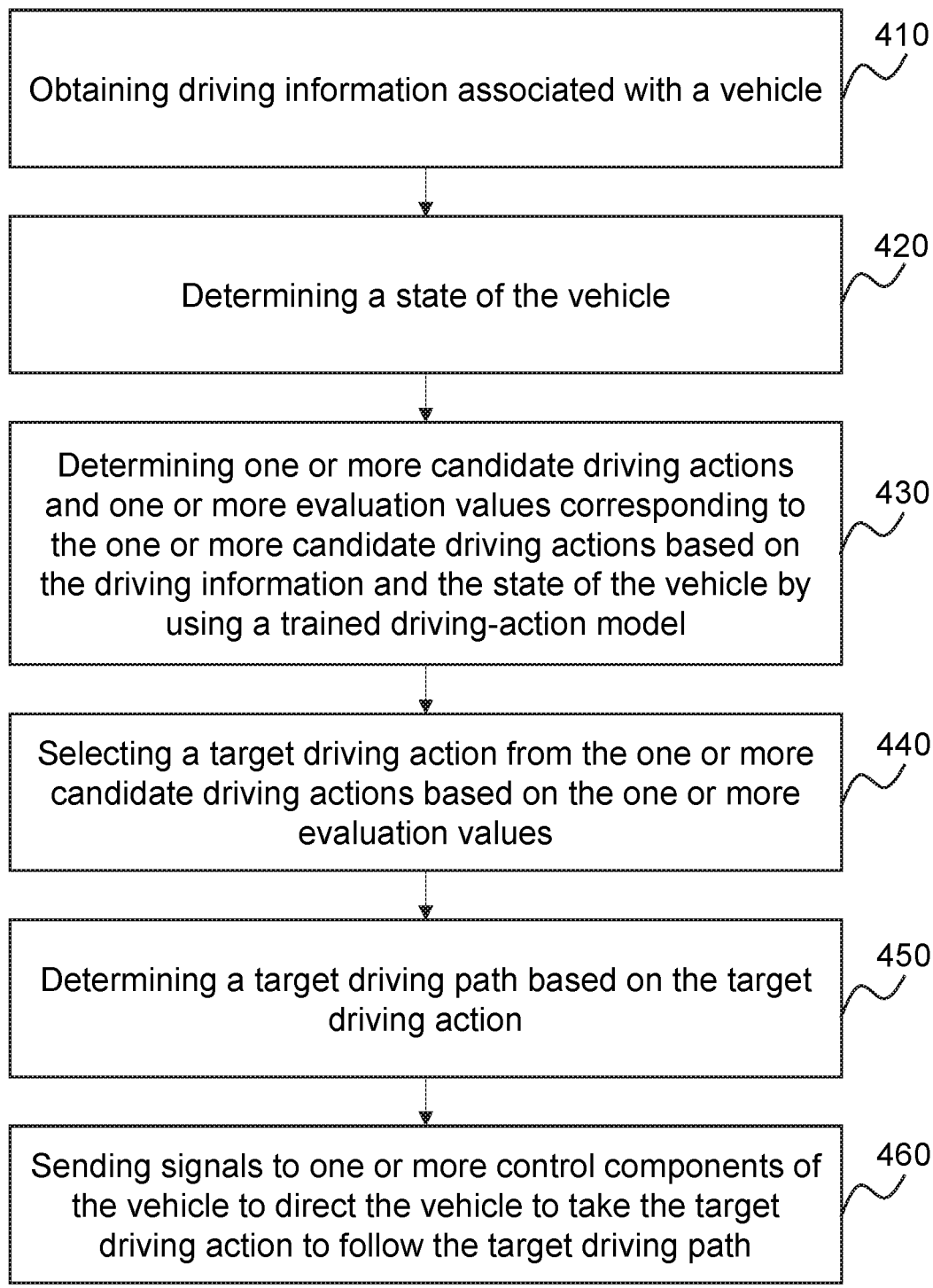
FIG. 4 is a flowchart illustrating an exemplary process for determining a target driving path according to some embodiments of the present disclosure.

FIG. 4 is a flowchart illustrating an exemplary process for determining a target driving path according to some embodiments of the present disclosure. The process 400 may be executed by the autonomous driving system 100. For example, the process 400 may be implemented as a set of instructions stored in the storage ROM 230 or RAM 240. The processor 220 and/or the modules in FIG. 3 may execute the set of instructions, and when executing the instructions, the processor 220 and/or the modules may be configured to perform the process 400. The operations of the illustrated process presented below are intended to be illustrative. In some embodiments, the process 400 may be accomplished with one or more additional operations not described and/or without one or more of the operations discussed. Additionally, the order in which the operations of the process 400 illustrated in FIG. 4 and described below is not intended to be limiting.

In 410, the processing engine 112 (e.g., the obtaining module 310) (e.g., the interface circuits of the processor 220) may obtain driving information associated with a vehicle (e.g., the vehicle 130). The processing engine 112 may obtain the driving information from the detection units (e.g., a camera, a radar) of the vehicle, a storage device (e.g., the storage 140) disclosed elsewhere in the present disclosure, or an external resource (e.g., a traffic guidance platform, a news platform). The processing engine 112 may obtain the driving information according to a certain time interval (e.g., 0.01 seconds, 0.02 seconds, 0.05 seconds), in real time, or substantially in real time.

In some embodiments, the driving information associated with the vehicle may include perception information within a first predetermined range of the vehicle, map information within the first predetermined range of the vehicle, or the like, or any combination thereof. The first predetermined range may be default settings of the autonomous driving system 100 or may be adjustable under different situations. For example, the first predetermined range may be a region (e.g., a circle, a rectangle, a square, a triangle, a polygon) with a current location of the vehicle as the center.

In some embodiments, the processing engine 112 may obtain the perception information from the detection units (e.g., a camera, a radar) of the vehicle. The perception information may include road condition information, obstacle information, or the like, or any combination thereof. The road condition information may include a road width, a road length, a road type (e.g., expressway, beltway, side road, flyover, one-way road, two-way road), traffic lane information, a traffic sign (e.g., a road indicator), traffic light information, pedestrian crossing information, or the like, or any combination thereof. The obstacle information may include a type of an obstacle (e.g., a vehicle, a pedestrian, an animal, a building, a tree, a roadblock), a location of the obstacle, a size of the obstacle, a velocity of the obstacle, a distance between the current location of the vehicle and the location of the obstacle, or the like, or any combination thereof.

In some embodiments, the processing engine 112 may obtain the map information from a storage device (e.g., the storage 140), such as the ones disclosed elsewhere in the present disclosure. As used herein, in some embodiments, the map information may be information included in a high precision map (e.g., HD map), which indicates high precision expression of the road condition information.

In 420, the processing engine 112 (e.g., the state determination module 320) (e.g., the processing circuits of the processor 220) may determine a state of the vehicle. The processing engine 112 may determine the state of the vehicle according to a certain time interval (e.g., 0.01 seconds, 0.02 seconds, 0.05 seconds, etc.), in real time, or substantially in real time.

In some embodiments, the state of the vehicle may include a current location of the vehicle, a velocity (e.g., an instantaneous velocity, an average velocity within a predetermined time period) of the vehicle, an acceleration (e.g., an instantaneous acceleration, an average acceleration within a predetermined time period) of the vehicle, an angle of a steering wheel of the vehicle, or the like, or any combination thereof. As used herein, the "velocity" includes "magnitude" information and/or "direction" information. For example, the velocity of the vehicle may be expressed as "70 km/h, 30°" which indicates that the magnitude of the velocity is 70 km/h and the direction of the velocity is a direction with a 30° angle from the horizontal direction. Similarly, the "acceleration" also includes "magnitude" information and/or "direction" information. In some embodiments, the state of the vehicle may further include remainder power, remainder gasoline volume, an oil temperature, a gas pressure, a tire pressure, etc.

In some embodiments, the processing engine 112 may obtain the state of the vehicle from the detection units of the vehicle. For example, the processing engine 112 may obtain the acceleration of the vehicle from the acceleration sensor. As another example, the processing engine 112 may obtain the angle of the steering wheel, which reflects an instant turning angle of the vehicle, from the steering angle sensor.

In 430, the processing engine 112 (e.g., the candidate driving action determination module 330) (e.g., the processing circuits of the processor 220) may determine one or more candidate driving actions and one or more evaluation values corresponding to the one or more candidate driving actions based on the driving information and the state of the vehicle by using a trained driving-action model. As used herein, an evaluation value corresponding to a specific driving action refers to a value which indicates a comprehensive reward (also referred to as an "expected reward") associated with the specific driving action to the driving process of the vehicle.

In some embodiments, a driving action may refer to an action associated with operation of the vehicle. In some embodiments, the driving action may include "stop," "keep lane," "follow," "turn left," "turn right," "nudge left," "nudge right," or the like, or any combination thereof. As used herein, "stop" refers to an action to stop the vehicle, "keep lane" refers to an action to direct the vehicle to drive along a lane where the vehicle is located, "follow" refers to an action to direct the vehicle to follow another vehicle in front of the vehicle, "turn left" or "turn right" refers to an action to direct the vehicle to turn left (or right) from the lane where the vehicle is located to an another lane which is parallel to the lane where the vehicle is located, and "nudge left" or "nudge right" refers to an action to direct the vehicle to turn left (or right) without leaving the lane where the vehicle is located. As used herein, a difference between "turn" and "nudge" is that it is necessary for a vehicle to change lanes to avoid a collision with an obstacle located in front of the vehicle under a "turn" action (e.g., "turn left," "turn right"), whereas, it is unnecessary for the vehicle to change lanes to avoid the collision with the obstacle located in front of the vehicle under a "nudge" action (e.g., "nudge left," nudge right"). More descriptions of the driving action may be found elsewhere in the present disclosure (e.g., FIG. 7 and descriptions thereof).

In some embodiments, the processing engine 112 may obtain the trained driving-action model from the training module 370 or a storage device (e.g., the storage 140) disclosed elsewhere in the present disclosure. In some embodiments, the trained driving-action model may include a Q-learning neural network model. The Q-learning neural network model may be a reinforcement learning model used in machine learning. More descriptions of the trained driving-action model may be found elsewhere in the present disclosure (e.g., FIGS. 5, 6, 9, and descriptions thereof).

In 440, the processing engine 112 (e.g., the target driving action determination module 340) (e.g., the processing circuits of the processor 220) may select a target driving action from the one or more candidate driving actions based on the one or more evaluation values.

In some embodiments, the processing engine 112 may identify a highest evaluation value from the one or more evaluation values corresponding to the one or more candidate driving actions and select a candidate driving action corresponding to the highest evaluation value as the target driving action.

In some embodiments, the processing engine 112 may select the target driving action from the one or more candidate driving actions according to one or more predetermined rules. The predetermined rules may be default settings of the autonomous driving system 100 or may be adjustable under different situations. For example, it can be assumed that the processing engine 112 determines two candidate driving actions "turn left" and "nudge left," the processing engine 112 may select "nudge left" as the target driving action, under which it is unnecessary for the vehicle to change lanes.

In 450, the processing engine 112 (e.g., the target driving path determination module 350) (e.g., the processing circuits of the processor 220) may determine a target driving path based on the target driving action.

In some embodiments, the processing engine 112 may determine a plurality of candidate driving paths based on the driving information associated with the vehicle, the state of the vehicle, and the target driving action. For example, the processing engine 112 may define a destination based on the target driving action and determine a plurality of curves associated with the current location of the vehicle and the defined destination based on the driving information (e.g., road condition information) according to a curve-fitting method. Further, the processing engine 112 may select curves which do not collide with obstacle(s) as the plurality of candidate driving paths. As another example, the processing engine 112 may determine the plurality of candidate driving paths based on the driving information associated with the vehicle, the state of the vehicle, and the target driving action according to a machine learning model (e.g., an artificial neural network model, a support vector machine (SVM) model, a decision tree model). More descriptions for determining the candidate driving paths may be found in International Application No. PCT/CN2017/092714 filed on Jul. 13, 2017, the entire contents of which are incorporated herein by reference in their entirety.

In some embodiments, generating the candidate driving paths may be performed based on certain restrictions. In certain embodiments, the restrictions may be based on the target driving action. For example, if "turn left" has been selected as the target driving action, such a selection automatically provides restrictions as to what candidate driving paths can be generated.

After determining the plurality of candidate driving paths, the processing engine 112 may select the target driving path from the plurality of candidate driving paths based on one or more features associated with each of the plurality of candidate driving paths, for example, an offset from the candidate driving path to a center line of a lane, a travel time of the candidate driving path, a comfort level of the candidate driving path, a distance between the candidate driving path and an obstacle, etc. As used herein, the comfort level may be associated with a plurality of accelerations corresponding to a plurality of points on the candidate driving path. For example, it is assumed that each of the plurality of accelerations is less than a first acceleration threshold (e.g., 3 m/s$^2$), the comfort level may be specified as 1, whereas, it is assumed that a percentage of accelerations which are higher than a second acceleration threshold (e.g., 10 m/s$^2$) is more than a percentage threshold (e.g., 50%, 60%, 70%), the comfort level may be specified as 0. Accordingly, the higher the percentage of accelerations which are more than the second acceleration threshold is, the lower the comfort level of the sample driving path may be.

For example, the processing engine 112 may determine a candidate driving path with an offset from the candidate driving path to a center line of a lane less than an offset threshold as the target driving path. As another example, the processing engine 112 may determine a candidate driving path with a travel time less than a time threshold as the target driving path. As a further example, the processing engine 112 may determine a candidate driving path with a comfort level higher than a level threshold as the target driving path. As a still further example, the processing engine 112 may determine a candidate driving path with a distance between the candidate driving path and an obstacle less than a distance threshold as the target driving path.

In some embodiments, the processing engine 112 may select the target driving path from the plurality of candidate driving paths based on a travel cost associated with each of the plurality of candidate driving paths. For example, the processing engine 112 may identify a smallest travel cost from a plurality of travel costs corresponding to the plurality of candidate driving paths and identify a candidate driving path corresponding to the smallest travel cost as the target driving path. More descriptions regarding determining the target driving path may be found in, for example, International Application No. PCT/CN2018/122102, entitled "SYSTEMS AND METHODS FOR DETERMINING DRIVING PATH IN AUTONOMOUS DRIVING," filed on even date, the contents of which are hereby incorporated by reference.

In 460, the processing engine 112 (e.g., the transmission module 360) (e.g., the interface circuits of the processor 220) may send signals to one or more control components (e.g., the steering device, the brake device, the accelerator) of the vehicle to direct the vehicle to take the target driving action to follow the target driving path. For example, the processing engine 112 may determine control commands (e.g., a steering command, an acceleration command) associated with the target driving action and the target driving path and transmit the control commands to the one or more control components.

It should be noted that the above description is merely provided for the purpose of illustration, and not intended to limit the scope of the present disclosure. For persons having ordinary skills in the art, multiple variations and modifications may be made under the teachings of the present disclosure. However, those variations and modifications do not depart from the scope of the present disclosure.

For example, the processing engine 112 may determine a plurality of sets of candidate driving paths based on the driving information associated with the vehicle, the state of the vehicle, and the one or more candidate driving actions determined in operation 430, wherein each set of the plurality of sets of candidate driving paths correspond to a candidate driving action. Further, the processing engine 112 may determine the target driving path from the plurality of sets of candidate driving paths according to operation 450. As another example, one or more other optional operations (e.g., a storing operation) may be added elsewhere in the process 400. In the storing operation, the processing engine 112 may store information and/or data (e.g., the driving information associated with the vehicle, the state of the vehicle, the candidate driving actions, the candidate driving paths) associated with the vehicle in a storage (e.g., the storage 140) disclosed elsewhere in the present disclosure. As a further example, operation 410 and operation 420 may be performed simultaneously.

Figure 5:
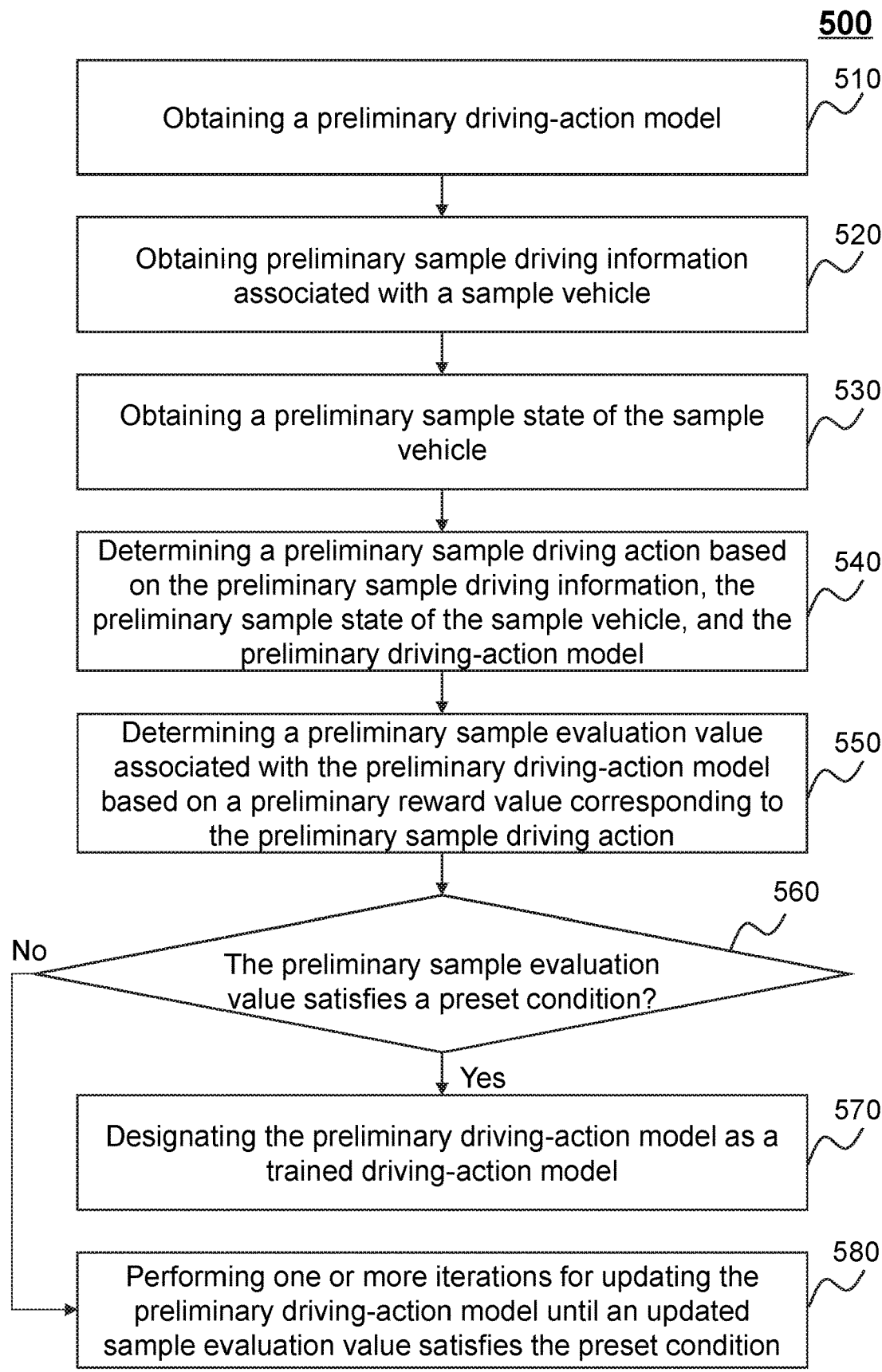
FIG. 5 is a flowchart illustrating an exemplary process for determining a trained driving-action model according to some embodiments of the present disclosure.
Figure 6:
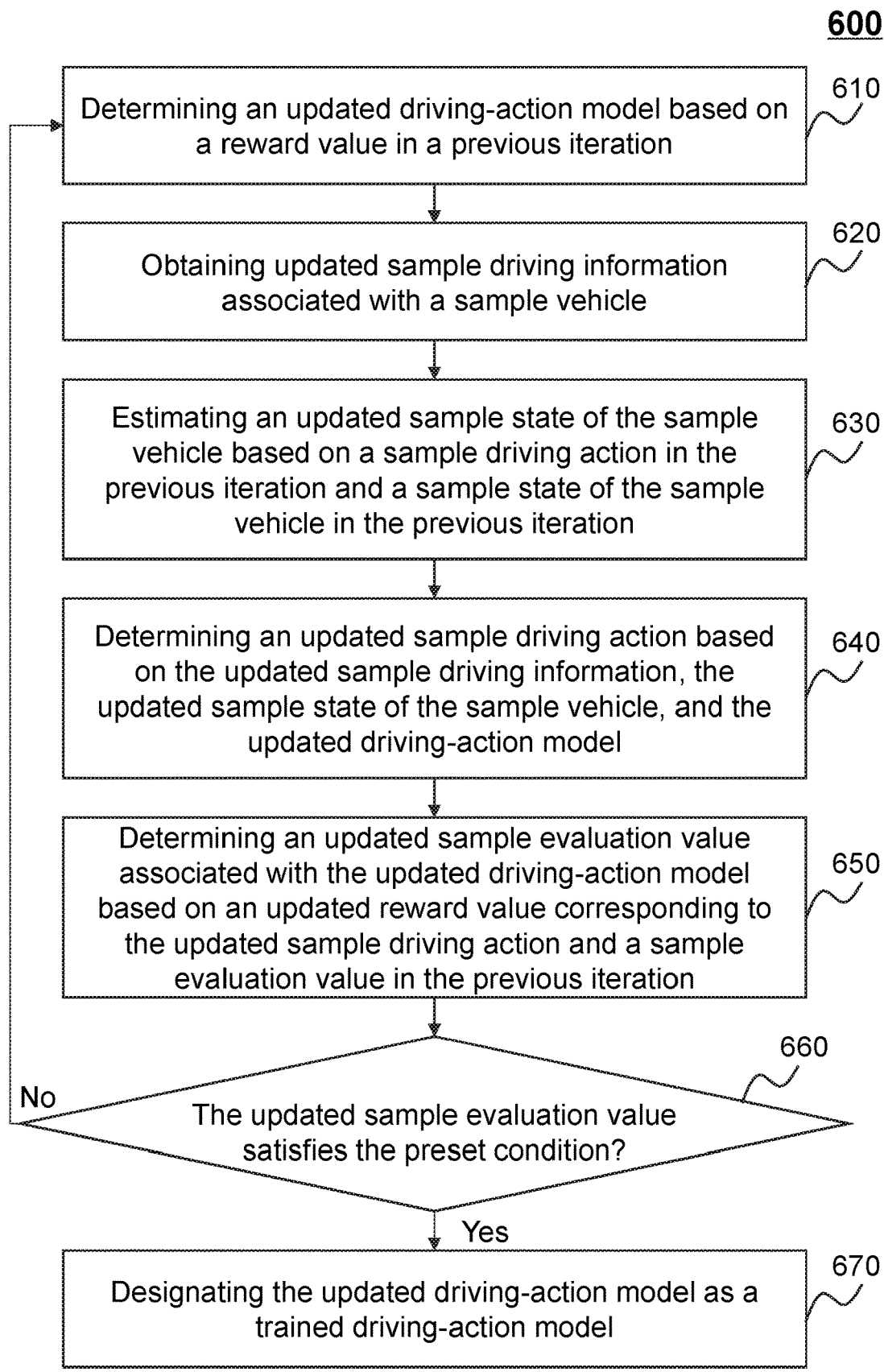
FIG. 6 is a flowchart illustrating an exemplary process for determining a trained driving-action model according to some embodiments of the present disclosure.

FIG. 5 is a flowchart illustrating an exemplary process for determining a trained driving-action model according to some embodiments of the present disclosure. The process 500 may be executed by the autonomous driving system 100. For example, the process 500 may be implemented as a set of instructions stored in the storage ROM 230 or RAM 240. The processor 220 and/or the training module 370 may execute the set of instructions, and when executing the instructions, the processor 220 and/or the training module 370 may be configured to perform the process 500. The operations of the illustrated process presented below are intended to be illustrative. In some embodiments, the process 500 may be accomplished with one or more additional operations not described and/or without one or more of the operations discussed. Additionally, the order in which the operations of the process 500 illustrated in FIG. 5 and described below is not intended to be limiting.

In 510, the processing engine 112 (e.g., the training module 370) (e.g., the interface circuits or the processing circuits of the processor 220) may obtain a preliminary driving-action model (e.g., a preliminary Q-learning neural network model). The processing engine 112 may obtain the preliminary driving-action model from a storage device (e.g., the storage 140) disclosed elsewhere in the present disclosure and/or an external data source (not shown) via the network 120. The preliminary driving-action model may include one or more preliminary parameters which may be default settings of the autonomous driving system 100 or may be adjustable in different situations.

In 520, the processing engine 112 (e.g., the training module 370) (e.g., the processing circuits of the processor 220) may obtain preliminary sample driving information associated with a sample vehicle. In some embodiments, the sample vehicle has similar features (e.g., vehicle type, vehicle model, vehicle year, vehicle weight, engine power) as the vehicle 130.

As described in connection with operation 410, the preliminary sample driving information associated with the sample vehicle may include preliminary sample perception information within a second predetermined range of the sample vehicle, preliminary sample map information within the second predetermined range of the sample vehicle, or the like, or any combination thereof. In some embodiments, the second predetermined range may be the same as or different from the first predetermined range described in connection with operation 410. The preliminary sample perception information may include preliminary sample road condition information, preliminary sample obstacle information, or the like, or any combination thereof. In some embodiments, the preliminary sample driving information associated with the sample vehicle may be default settings of the autonomous driving system 100 or may be adjustable under different situations.

In 530, the processing engine 112 (e.g., the training module 370) (e.g., the processing circuits of the processor 220) may obtain a preliminary sample state of the sample vehicle.

As described in connection with operation 420, the preliminary sample state of the sample vehicle may include a preliminary sample velocity (e.g., a preliminary sample instantaneous velocity, a preliminary sample average velocity within a predetermined time period) of the sample vehicle, a preliminary sample acceleration (e.g., a preliminary sample instantaneous acceleration, a preliminary sample average acceleration within a predetermined time period) of the sample vehicle, a preliminary sample angle of a steering wheel of the sample vehicle, or the like, or any combination thereof. In some embodiments, the preliminary sample state of the sample vehicle may further include preliminary sample remainder power, preliminary sample remainder gasoline volume, a preliminary sample oil temperature, a preliminary sample gas pressure, a preliminary sample tire pressure etc. In some embodiments, the preliminary state of the sample vehicle may be default settings of the autonomous driving system 100 or may be adjustable under different situations.

In 540, the processing engine 112 (e.g., the training module 370) (e.g., the processing circuits of the processor 220) may determine a preliminary sample driving action based on the preliminary sample driving information, the preliminary sample state of the sample vehicle, and the preliminary driving-action model. As described in connection with operation 430, the preliminary sample driving action may include "stop," "keep lane," "follow," "turn left," "turn right," "nudge left," "nudge right," or the like, or any combination thereof. For example, it is assumed that the driving information indicates that there is an obstacle in front of the sample vehicle, the processing engine 112 may determine a preliminary sample driving action "turn left" or "nudge left" according to the preliminary driving-action model.

In 550, the processing engine. 112 (e.g., the training module 370) (e.g., the processing circuits of the processor 220) may determine a preliminary sample evaluation value associated with the preliminary driving-action model based on a preliminary reward value corresponding to the preliminary sample driving action. As used herein, take a specific sample driving action as an example, a reward value corresponding to the specific sample driving action may be a parameter which is used to evaluate the contribution of the specific sample driving action to the driving process of the sample vehicle. Also take the specific sample driving action in a specific iteration as an example, an evaluation value corresponding to the specific sample driving action may be a value which indicates a comprehensive reward (also referred to as an "expected reward") associated with the specific sample driving action to the driving process of the sample vehicle up to the specific iteration.

In some embodiments, the preliminary reward value may be associated with a distance between a preliminary sample driving path associated with the preliminary sample driving action and an obstacle. In some embodiments, the preliminary reward value may be associated with a smoothness of the preliminary sample driving path as connected to the immediately preceding driving path. In some embodiments, the preliminary reward value may be associated with a comfort level of the preliminary sample driving path. In some embodiments, as described in connection with operation 450, the processing engine 112 may determine the preliminary sample driving path based on the preliminary sample driving action. In some embodiments, the longer the distance between the preliminary sample driving path associated with the preliminary sample driving action and the obstacle is, the higher the preliminary reward value may be. In some embodiments, the higher the smoothness is, the higher the preliminary reward value may be. In some embodiments, the higher the comfort level is, the higher the preliminary reward value may be.

In some embodiments, the processing engine 112 may determine a perception area associated with the preliminary sample driving path and determine a distance between the preliminary sample driving path and an obstacle in the perception area. The size of the perception area may be default settings (e.g., 50 cm×50 cm, 100 cm×100 cm, 200 cm×200 cm, 500 cm×500 cm, 1000 cm×1000 cm) of the autonomous driving system 100 or may be adjustable under different situations. As used herein, the distance between the preliminary sample driving path and the obstacle in the perception area may be a shortest distance between the preliminary sample driving path and the obstacle. For an ordinary person in the art, it is known that an obstacle has a certain size. Take a top view as an example, it can be considered that the obstacle includes a plurality of points and each of the plurality of points corresponds to a distance to the preliminary sample driving path. The "shortest distance" refers to the shortest one among the plurality of distances corresponding to the plurality of points.

In some embodiments, there may be a plurality of obstacles in the perception area. In this situation, the processing engine 112 may determine a candidate distance (which is a shortest distance) between the preliminary sample driving path and each of the plurality of obstacles and determine a comprehensive distance between the preliminary sample driving path and the plurality of obstacles based on a plurality of candidate distances corresponding to the plurality of obstacles. For example, the processing engine 112 may identify a shortest candidate distance from the plurality of candidate distances corresponding to the plurality of obstacles as the comprehensive distance between the preliminary sample driving path and the plurality of obstacles. As another example, the processing engine 112 may determine an average or a weighted average of the plurality of candidate distances as the comprehensive distance between the preliminary sample driving path and the plurality of obstacles. More descriptions of the determination of the distance between the preliminary sample driving path and an obstacle may be found elsewhere in the present disclosure (e.g., FIG. 8 and descriptions thereof).

In some embodiments, the processing engine 112 may define a specific range (e.g., 0~1), map the distance between the preliminary sample driving path associated with the preliminary sample driving action and the obstacle into the specific range, and designate a corresponding mapping value as the preliminary reward value corresponding to the preliminary driving action. For example, it is assumed that the distance between the preliminary sample driving path associated with the preliminary sample driving action and the obstacle is longer than a first distance threshold (e.g., 0.5 m), the processing engine 112 may determine that the preliminary reward value corresponding to the preliminary sample driving action is 1; whereas, it is assumed that the distance between the preliminary sample driving path associated with the preliminary sample driving action and the obstacle is smaller than a second distance threshold (e.g., 0.01 m), the processing engine 112 may determine that the preliminary reward value corresponding to the preliminary sample driving action is 0. Accordingly, the longer the distance between the preliminary sample driving path associated with the preliminary sample driving action and the obstacle is, the higher the preliminary reward value corresponding to the preliminary sample driving action may be. The first distance threshold and/or the second distance threshold may be default settings of the autonomous driving system 100 or may be adjustable under different situations.

In some embodiments, the processing engine 112 may determine the preliminary sample evaluation value associated with the preliminary driving-action model based on an action-utility function (also referred to as a Q-function) according to formula (1) below:

$$Q'(s,a)=Q(s,a)+\alpha(r_{i,t}+\lambda Q^*(s,a)) \quad (1)$$

where a refers to a sample driving action in an ith iteration; s refers to a sample state of the sample vehicle in the ith iteration; Q'(s,a) refers to a sample evaluation value associated with a driving-action model in the ith iteration; Q(s,a) refers to a sample evaluation value associated with a driving-action model in a previous iteration (which may be a default value in a first iteration); Q*(s,a) refers to an optimal sample evaluation value associated with the driving-action model corresponding to the ith iteration; a refers to a learning rate; $r_{i,t}$ refers to a reward value corresponding to the sample driving action in the ith iteration; and λ refers to a discount factor (e.g., a value within 0~1). In some embodiments, the learning rate and/or the discount factor may be default settings of the autonomous driving system 100 or may be adjustable under different situations. In some embodiments, the optimal sample evaluation value corresponding to the ith iteration may be determined based on a plurality of sample evaluation values determined in a plurality of previous iterations. For example, the optimal evaluation value may be an average of the plurality of sample evaluation values determined in the plurality of previous iterations. As another example, the optimal evaluation value may be a highest sample evaluation value among the plurality of sample evaluation values determined in the plurality of previous iterations.

In 560, the processing engine 112 (e.g., the training module 370) (e.g., the processing circuits of the processor 220) may determine whether the preliminary sample evaluation value satisfies a preset condition.

In some embodiments, the processing engine 112 may determine whether the preliminary sample evaluation value is higher than a first threshold. In response to the determination that the preliminary sample evaluation value is higher than the first threshold, the processing engine 112 may determine that the preliminary sample evaluation value satisfies the preset condition. In response to the determination that the preliminary sample evaluation value is less than or equal to the first threshold, the processing engine 112 may determine that the preliminary sample evaluation value does not satisfy the preset condition.

In some embodiments, the processing engine 112 may determine whether a number count of iterations is higher than a second threshold. In response to the determination that the number count of iterations is higher than the second threshold, the processing engine 112 may determine that the preliminary sample evaluation value satisfies the preset condition. In response to the determination that the number count of iterations is less than or equal to the second threshold, the processing engine 112 may determine that the preliminary sample evaluation value does not satisfy the preset condition. The first threshold and/or the second threshold may be default settings of the autonomous driving system 100 or may be adjustable under different situations.

In some embodiments, the processing engine 112 may determine a loss function of the preliminary driving-action model and determine a value of the loss function based on the preliminary sample evaluation value. Further, the processing engine 112 may determine whether the value of the loss function is less than a loss threshold. In response to the determination that the value of the loss function is less than the loss threshold, the processing engine 112 may determine that the preliminary sample evaluation value satisfies the preset condition. In response to the determination that the value of the loss function is higher than or equal to the loss threshold, the processing engine 112 may determine that the preliminary sample evaluation value does not satisfy the preset condition.

In response to the determination that the preliminary sample evaluation value satisfies the preset condition, the processing engine 112 (e.g., the training module 370) (e.g., the processing circuits of the processor 220) may designate the preliminary driving-action model as a trained driving-action model in 570.

In response to the determination that the preliminary sample evaluation value does not satisfy the preset condition, the processing engine 112 (e.g., the training module 370) (e.g., the processing circuits of the processor 220) may execute the process 500 to operation 580 to perform one or more iterations for updating the preliminary driving-action model until an updated sample evaluation value satisfies the preset condition. An exemplary iteration is described below in FIG. 6.

In 610, the processing engine 112 (e.g., the training module 370) (e.g., the processing circuits of the processor 220) may determine an updated driving-action model based on a reward value in a previous iteration.

In some embodiments, the processing engine 112 may determine the updated driving-action model by updating one or more parameters of a driving-action model in the previous iteration (e.g., the one or more preliminary parameters of the preliminary driving-action model), wherein under the updated one or more parameters, the reward value and/or the sample evaluation value may be increased.

In 620, the processing engine 112 (e.g., the training module 370) (e.g., the processing circuits of the processor 220) may obtain updated sample driving information associated with the sample vehicle.

In 630, the processing engine 112 (e.g., the training module 370) (e.g., the processing circuits of the processor 220) may estimate an updated sample state of the sample vehicle based on a sample driving action in the previous iteration and a sample state of the sample vehicle in the previous iteration.

In some embodiments, the processing engine 112 may estimate the updated sample state of the sample vehicle based on the sample driving action in the previous iteration and the sample state of the sample vehicle in the previous iteration according to a simulation model. In some embodiments, the simulation model may be configured with one or more features (e.g., vehicle type, vehicle weight, vehicle model, vehicle year, engine power, brake efficiency) of the sample vehicle, road condition information, obstacle information, map information, or the like, or any combination thereof. The processing engine 112 may simulate operation of the sample vehicle based on the simulation model and determine the updated sample state of the sample vehicle based on a simulation result.

In 640, the processing engine 112 (e.g., the training module 370) (e.g., the processing circuits of the processor 220) may determine an updated sample driving action based on the updated sample driving information, the updated sample state of the sample vehicle, and the updated driving-action model. For example, the processing engine 112 may input the updated sample driving information and the updated sample state of the sample vehicle into the updated driving-action model. The processing engine 112 may determine the updated sample driving action based on an output of the updated driving-action model.

In 650, the processing engine 112 (e.g., the training module 370) (e.g., the processing circuits of the processor 220) may determine an updated sample evaluation value associated with the updated driving-action model based on an updated reward value corresponding to the updated sample driving action and a sample evaluation value in the previous iteration. For example, the processing engine 112 may determine the updated sample evaluation value according to formula (1).

In 660, as described in connection with operation 560, the processing engine 112 (e.g., the training module 370) (e.g., the processing circuits of the processor 220) may determine whether the updated sample evaluation value satisfies the preset condition.

In some embodiments, the processing engine 112 may also determine whether the updated driving-action model is convergent. For example, the processing engine 112 may determine whether a difference value between the update sample evaluation value and a sample evaluation value in the previous iteration is less than a difference threshold. In response to the determination that the difference value is less than the difference threshold, the processing engine 112 may determine that the updated driving-action model is convergent, and accordingly, the processing engine 112 may determine that the updated sample evaluation value satisfies the preset condition. In response to the determination that the difference value is higher than or equal to the difference threshold, the processing engine 112 may determine that the updated sample evaluation value does not satisfy the preset condition.

In response to the determination that updated sample evaluation value satisfies the preset condition, the processing engine 112 may designate the updated driving-action model as the trained driving-action model in 670.

In response to the determination that updated sample evaluation value does not satisfy the preset condition, the processing engine 112 may execute the process 600 to return to operation 610 to update the updated driving-action model (i.e., start a next iteration) until the updated sample evaluation value satisfies the preset condition.

It should be noted that the above description is merely provided for the purpose of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, one or more other optional operations (e.g., a storing operation) may be added elsewhere in the process 500 and/or the process 600. In the storing operation, the processing engine 112 may store information and/or data (e.g., the sample driving information, the sample state of the sample vehicle) associated with the sample vehicle in a storage device (e.g., the storage 140) disclosed elsewhere in the present disclosure. As another example, operation 520 and operation 530 may be performed simultaneously. As a further example, operation 620 and operation 630 may be performed simultaneously. As still a further example, in operation 540, the processing engine 112 may randomly select a driving action as the preliminary sample driving action. As still a further example, the preliminary reward value may be associated with other features (e.g., a travel time) of the preliminary sample driving path.

Figure 7:
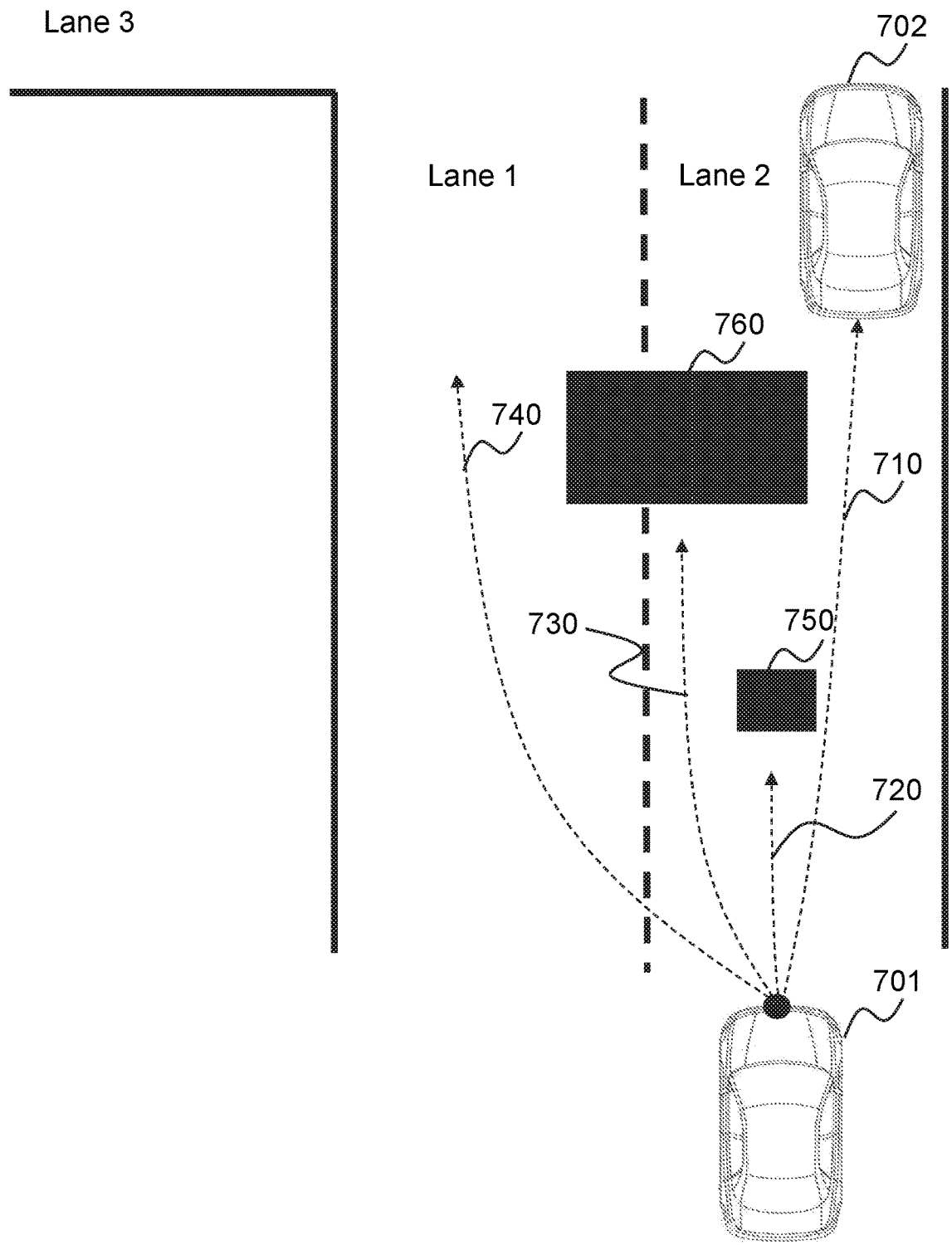
FIG. 7 is a schematic diagram illustrating exemplary driving actions according to some embodiments of the present disclosure.

FIG. 7 is a schematic diagram illustrating exemplary driving actions according to some embodiments of the present disclosure. As illustrated, a road scenario including lane 1, lane 2, and lane 3 is described as an example, wherein lane 1 is parallel to lane 2 and lane 3 is perpendicular to lane 1 and lane 2. Further, 701 refers to a vehicle and 702 refers to another vehicle in front of it. 740 and 760 refer to obstacles. A curve 710 refers to a driving path associated with the driving action "follow" which refers to an action to direct the vehicle 701 to follow the vehicle 702 in front of it. A curve 720 refers to a driving path associated with the driving action "keep lane" which refers to an action to direct the vehicle 701 to drive along lane 2. A curve 730 refers to a driving path associated with the driving action "nudge left" which refers to an action to direct the vehicle 701 to turn left without leaving lane 2. In this situation, the vehicle 701 can avoid a collision with the obstacle 750 without leaving lane 2. A curve 740 refers to a driving path associated with the driving action "turn left" which refers to an action to direct the vehicle 701 to turn left from lane 2 to lane 1. In this situation, in order to avoid a collision with the obstacle 760, the vehicle 701 needs to change from lane 2 to lane 1.

In addition, it is assumed that the processing engine 112 determines that the vehicle 701 needs to change from lane 1 to lane 3, the processing engine 112 may determine the driving action "keep lane" on lane 1, and the driving action "keep lane" on lane 3 respectively, rather than "turn left" or "nudge left."

Figure 8:
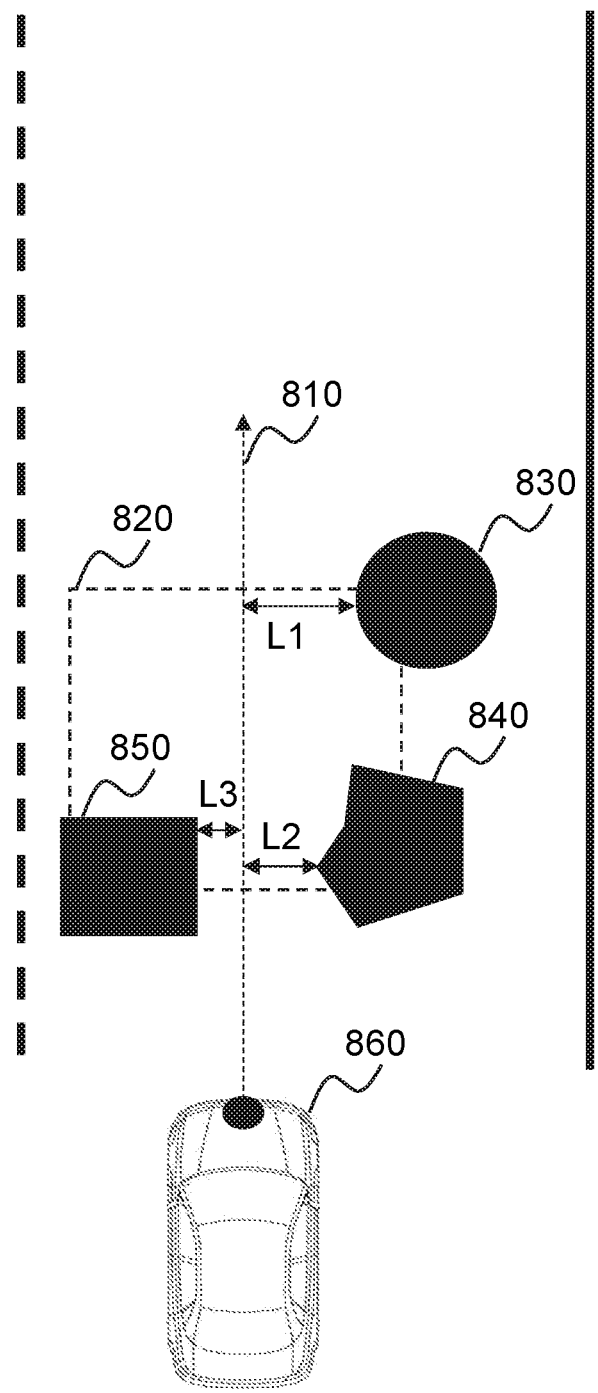
FIG. 8 is a schematic diagram illustrating an exemplary comprehensive distance between a driving path and a plurality of obstacles according to some embodiments of the present disclosure.

FIG. 8 is a schematic diagram illustrating an exemplary comprehensive distance between a driving path and a plurality of obstacles according to some embodiments of the present disclosure. As illustrated, a curve 810 refers to a driving path of a vehicle 860. It can be seen that there are a plurality of obstacles (e.g., an obstacle 830, an obstacle 840, and an obstacle 850) around the driving path 810 of the vehicle 860 within a perception area 820. The processing engine 112 may determine a candidate distance between the driving path 810 and each of the plurality of obstacles in the perception area. For example, the processing engine 112 may determine a candidate distance $L_1$ between the driving path 810 and the obstacle 830, a candidate distance $L_2$ between the driving path 810 and the obstacle 840, and a candidate distance $L_3$ between the driving path 810 and the obstacle 850. The processing engine 112 may further determine a comprehensive distance between the driving path 810 and the plurality of obstacles based on the three candidate distances. For example, the processing engine 112 may determine a shortest candidate distance (i.e., the candidate distance $L_3$ between the driving path 810 and the obstacle 850) among the three distances as the comprehensive distance between the driving path 810 and the plurality of obstacles. As another example, the processing engine 112 may determine an average (i.e., $(L_1+L_2+L_3)/3$) of the three candidate distances as the comprehensive distance between the driving path 810 and the plurality of obstacles.

Figure 9:
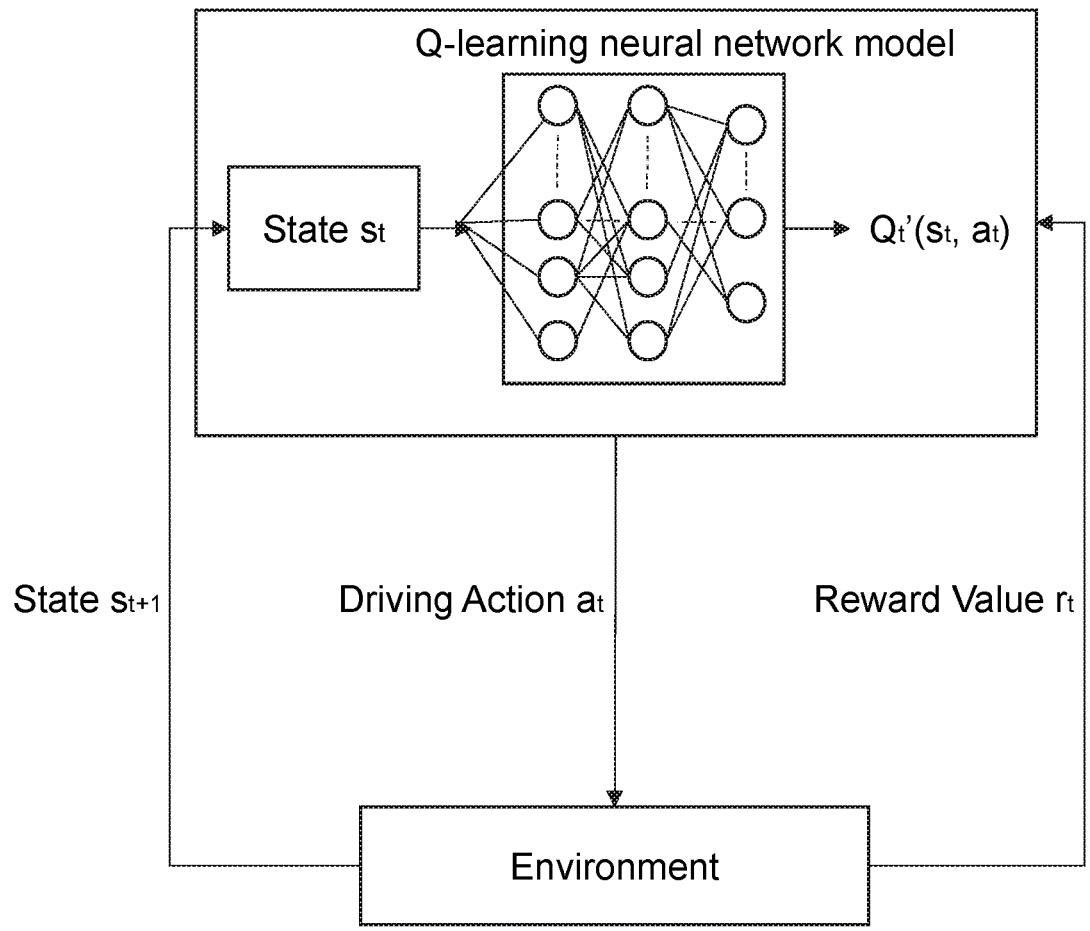
FIG. 9 is a schematic diagram illustrating an exemplary process for training a Q-learning neural network model according to some embodiments of the present disclosure.

FIG. 9 is a schematic diagram illustrating an exemplary process for training a Q-learning neural network model according to some embodiments of the present disclosure.

As illustrated in FIG. 9, "environment" refers to a scenario in which a sample vehicle is located, and we can assume that the "environment" is a land traffic scenario. According to the present disclosure, it is known that the training process includes one or more iterations and an ith iteration is described here as an example. Specifically, the processing engine 112 may determine a sample state $s_t$ (e.g., a location, a velocity) of the sample vehicle at a time point t. The processing engine 112 may determine a sample driving action $a_t$ corresponding to the time point t for the sample vehicle based on the sample state $s_t$ of the sample vehicle (sample driving information is omitted here for convenience) according to a Q-learning neural network model in the ith iteration. Further, the processing engine 112 may determine a reward value $r_t$ corresponding to the sample driving action $a_t$, and simultaneously or successively, the processing engine 112 may determine a sample evaluation value $Q_t'(s_t, a_t)$ associated with Q-learning neural network model corresponding to the sample driving action $a_t$. The processing engine 112 may determine whether the sample evaluation value $Q_t'(s_t, a_t)$ satisfies a preset condition as described in connection with operation 560. In response to the determination that the sample evaluation value $Q_t'(s_t, a_t)$ satisfies the preset condition, the processing engine 112 may designate the Q-learning neural network model in the ith iteration as a final trained Q-learning neural network model. In response to the determination that the sample evaluation value $Q_t'(s_t, a_t)$ does not satisfy the preset condition, the processing engine 112 may start a next iteration until an updated sample evaluation value satisfies the preset condition.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in a combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2103, Perl, COBOL 2102, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, for example, an installation on an existing server or mobile device.

Similarly, it should be appreciated that in the foregoing description of embodiments of the present disclosure, various features are sometimes grouped in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A system for determining a driving action in autonomous driving, comprising:
   at least one storage medium including a set of instructions; and
   at least one processor in communication with the at least one storage medium, wherein when executing the set of instructions, the at least one processor is directed to cause the system to:
      obtain driving information associated with a vehicle through one or more detection units of the vehicle by sensing environmental information around the vehicle;
      determine a state of the vehicle through the one or more detection units;
      determine one or more candidate driving actions and one or more evaluation values corresponding to the one or more candidate driving actions based on the driving information and the state of the vehicle by using a trained driving-action model;
      select a target driving action from the one or more candidate driving actions based on the one or more evaluation values;
      determine a plurality of candidate driving paths associated with the target driving action;
      select a candidate driving path from the plurality of candidate driving paths based at least in part on travel times of the plurality of candidate driving paths as the target driving path, wherein to select the candidate driving path from the plurality of candidate driving paths based at least in part on the travel times of the plurality of candidate driving paths as the target driving path, the at least one processor is directed to cause the system to:
         select, from the plurality of candidate driving paths, a candidate driving path with a travel time less than a time threshold and an offset from the candidate driving path to a center line of a lane less than an offset threshold as the target driving path; and
      send signals to a control component of the vehicle to direct the vehicle to take the target driving action to follow the target driving path.

2. The system of claim 1, wherein the driving information associated with the vehicle includes perception information within a predetermined range of the vehicle and map information within the predetermined range of the vehicle.

3. The system of claim 2, wherein the perception information includes road condition information and obstacle information.

4. The system of claim 1, wherein the state of the vehicle includes a velocity of the vehicle, an acceleration of the vehicle, and an angle of a steering wheel of the vehicle.

5. The system of claim 1, wherein the trained driving-action model is determined with a training process, the training process comprising:
obtaining a preliminary driving-action model;
obtaining preliminary sample driving information, the preliminary sample driving information including preliminary sample perception information within a predetermined range of a sample vehicle and preliminary sample map information within the predetermined range of the sample vehicle;
obtaining a preliminary sample state of the sample vehicle;
determining a preliminary sample driving action based on the preliminary sample driving information, the preliminary sample state of the sample vehicle, and the preliminary driving-action model;
determining a preliminary sample evaluation value associated with the preliminary driving-action model based on a preliminary reward value corresponding to the preliminary sample driving action, wherein the preliminary reward value is associated with a distance between a preliminary sample driving path associated with the preliminary sample driving action and an obstacle;
determining whether the preliminary sample evaluation value satisfies a preset condition; and
designating the preliminary driving-action model as the trained driving-action model in response to the determination that the preliminary sample evaluation value satisfies the preset condition.

6. The system of claim 5, wherein the training process further includes:
in response to the determination that the preliminary sample evaluation value does not satisfy the preset condition, performing one or more iterations for updating the preliminary driving-action model until an updated sample evaluation value satisfies the preset condition, wherein each of the one or more iterations includes:
determining an updated driving-action model based on a reward value in a previous iteration;
obtaining updated sample driving information;
estimating an updated sample state of the sample vehicle based on a sample driving action in the previous iteration and a sample state of the sample vehicle in the previous iteration;
determining an updated sample driving action based on the updated sample driving information, the updated sample state of the sample vehicle, and the updated driving-action model;
determining an updated sample evaluation value associated with the updated driving-action model based on an updated reward value corresponding to the updated sample driving action and a sample evaluation value in the previous iteration; and
determining whether the updated sample evaluation value satisfies the preset condition.

7. The system of claim 1, wherein the trained driving-action model includes a Q-learning neural network model.

8. The system of claim 1, wherein to select the target driving action from the one or more candidate driving actions based on the one or more evaluation values, the at least one processor is directed to cause the system to:
select the target driving action from the one or more candidate driving actions based on the one or more evaluation values according to a predetermined rule.

9. A method for determining a driving action in autonomous driving comprising:
obtaining driving information associated with a vehicle through one or more detection units of the vehicle by sensing environmental information around the vehicle;
determining a state of the vehicle through the one or more detection units;
determining one or more candidate driving actions and one or more evaluation values corresponding to the one or more candidate driving actions based on the driving information and the state of the vehicle by using a trained driving-action model;
selecting a target driving action from the one or more candidate driving actions based on the one or more evaluation values;
determining a plurality of candidate driving paths associated with the target driving action;
selecting a candidate driving path from the plurality of candidate driving paths based at least in part on travel times of the plurality of candidate driving paths as the target driving path, wherein the selecting the candidate driving path from the plurality of candidate driving paths based at least in part on the travel times of the plurality of candidate driving paths as the target driving path comprises:
selecting, from the plurality of candidate driving paths, a candidate driving path with a travel time less than a time threshold and an offset from the candidate driving path to a center line of a lane less than an offset threshold as the target driving path; and
sending signals to a control component of the vehicle to direct the vehicle to take the target driving action to follow the target driving path.

10. The method of claim 9, wherein the driving information associated with the vehicle includes perception information within a predetermined range of the vehicle and map information within the predetermined range of the vehicle.

11. The method of claim 10, wherein the perception information includes road condition information and obstacle information.

12. The method of claim 9, wherein the state of the vehicle includes a velocity of the vehicle, an acceleration of the vehicle, and an angle of a steering wheel of the vehicle.

13. The method of claim 9, wherein the trained driving-action model is determined with a training process, the training process comprising:
obtaining a preliminary driving-action model;
obtaining preliminary sample driving information, the preliminary sample driving information including preliminary sample perception information within a predetermined range of a sample vehicle and preliminary sample map information within the predetermined range of the sample vehicle;
obtaining a preliminary sample state of the sample vehicle;
determining a preliminary sample driving action based on the preliminary sample driving information, the preliminary sample state of the sample vehicle, and the preliminary driving-action model;
determining a preliminary sample evaluation value associated with the preliminary driving-action model based on a preliminary reward value corresponding to the preliminary driving action, wherein the preliminary reward value is associated with a distance between a preliminary sample driving path associated with the preliminary sample driving action and an obstacle;

determining whether the preliminary sample evaluation value satisfies a preset condition; and designating the preliminary driving-action model as the trained driving-action model in response to the determination that the preliminary sample evaluation value satisfies the preset condition.

14. The method of claim 13, wherein the training process further includes:

in response to the determination that the preliminary sample evaluation value does not satisfy the preset condition, performing one or more iterations for updating the preliminary driving-action model until an updated sample evaluation value satisfies the preset condition, wherein each of the one or more iterations includes:

determining an updated driving-action model based on a reward value in a previous iteration;

obtaining updated sample driving information;

estimating an updated sample state of the sample vehicle based on a sample driving action in the previous iteration and a sample state of the sample vehicle in the previous iteration;

determining an updated sample driving action based on the updated sample driving information, the updated sample state of the sample vehicle, and the updated driving-action model;

determining an updated sample evaluation value associated with the updated driving-action model based on an updated reward value corresponding to the updated sample driving action and a sample evaluation value in the previous iteration; and determining whether the updated sample evaluation value satisfies the preset condition.

15. The method of claim 9, wherein the trained driving-action model includes a Q-learning neural network model.

16. The method of claim 9, wherein selecting the target driving action from the one or more candidate driving actions based on the one or more evaluation values includes:

selecting the target driving action from the one or more candidate driving actions based on the one or more evaluation values according to a predetermined rule.

17. The system of claim 1, wherein to select the candidate driving path from the plurality of candidate driving paths based at least in part on the travel times of the plurality of candidate driving paths as the target driving path, the at least one processor is directed to cause the system to:

select, from the plurality of candidate driving paths, a candidate driving path with a travel time less than the time threshold, an offset from the candidate driving path to a center line of a lane less than the offset threshold, and a comfort level of the candidate driving path higher than a level threshold as the target driving path.

18. The method of claim 9, wherein the selecting the candidate driving path from the plurality of candidate driving paths based at least in part on the travel times of the plurality of candidate driving paths as the target driving path comprises:

selecting, from the plurality of candidate driving paths, a candidate driving path with a travel time less than the time threshold, an offset from the candidate driving path to a center line of a lane less than the offset threshold, and a comfort level of the candidate driving path higher than a level threshold as the target driving path.

* * * * *